United States Patent
Lindsay et al.

(10) Patent No.: US 8,127,015 B2
(45) Date of Patent: Feb. 28, 2012

(54) ALERTING SYSTEM, ARCHITECTURE AND CIRCUITRY

(75) Inventors: Steven B. Lindsay, Mission Viejo, CA (US); Andrew M. Naylor, Costa Mesa, CA (US)

(73) Assignee: Broadcom Corporation, Irvine, CA (US)

( * ) Notice: Subject to any disclaimer, the term of this patent is extended or adjusted under 35 U.S.C. 154(b) by 3145 days.

(21) Appl. No.: 10/132,639

(22) Filed: Apr. 24, 2002

(65) Prior Publication Data

US 2003/0014517 A1    Jan. 16, 2003

Related U.S. Application Data

(60) Provisional application No. 60/286,320, filed on Apr. 24, 2001.

(51) Int. Cl.
*G06F 15/16* (2006.01)

(52) U.S. Cl. .......................... 709/227; 709/203; 709/228

(58) Field of Classification Search .................. 709/302, 709/228, 224, 220, 227, 203; 713/171; 370/252, 370/229; 712/300; 710/105
See application file for complete search history.

(56) References Cited

U.S. PATENT DOCUMENTS

| | | | |
|---|---|---|---|
| 6,032,253 A * | 2/2000 | Cashman et al. | 712/300 |
| 6,175,927 B1 * | 1/2001 | Cromer et al. | 713/300 |
| 6,292,831 B1 | 9/2001 | Cheng | |
| 6,304,900 B1 | 10/2001 | Cromer et al. | |
| 6,363,071 B1 | 3/2002 | Fink et al. | |
| 6,915,431 B1 * | 7/2005 | Vasudevan et al. | 713/171 |
| 6,922,722 B1 * | 7/2005 | Mann et al. | 709/220 |
| 2001/0003526 A1 | 6/2001 | Kanehara | |
| 2002/0016843 A1 * | 2/2002 | Schweitzer et al. | 709/227 |
| 2002/0105905 A1 * | 8/2002 | Boyle et al. | 370/229 |

OTHER PUBLICATIONS

Cline, Kevin Alert Standard Forum (ASF) Specification Version 1.0c Jan. 17, 2001 Copyright 2000 Distributed Management Task Force, INC (DMTF).*
International Search Report, Feb. 28, 2003, 4 pages.

* cited by examiner

*Primary Examiner* — Djenane Bayard
(74) *Attorney, Agent, or Firm* — Thomas, Kayden, Horstemeyer & Risley, LLP

(57) ABSTRACT

A method for supporting ASF in an ASD using one or more embedded processors. In one aspect of the invention the method comprises accepting ASF related packets, examining the ASF related packets using a firmware routine running on the one or more embedded processors, and generating a response. It is emphasized that this abstract is provided to comply with the rules requiring an abstract, which will allow a searcher or other reader to quickly ascertain the subject matter of the technical disclosure. It is submitted with the understanding that it will not be used to interpret or limit the scope or the meaning of the claims.

24 Claims, 4 Drawing Sheets

ALERTING SYSTEM, ARCHITECTURE AND CIRCUITRY

CROSS-REFERENCE TO RELATED APPLICATIONS

The present application claims priority on the basis of the following U.S. Provisional Patent Application, the entire contents of which is herein incorporated by reference as though set forth in full: Ser. No. 60/286,320, filed Apr. 24, 2001, and entitled "INTEGRATED GIGABIT ETHERNET PCI-X CONTROLLER." The present application also is related to co-pending U.S. patent application Ser. No. 09/865,844, filed May 25, 2001, and entitled "MULTIPROTOCOL COMPUTER BUS INTERFACE ADAPTER AND METHOD," the entire contents of which is incorporated herein by reference as though set forth in full. The present application also is related to co-pending U.S. patent application entitled "POWER MANAGEMENT SYSTEM AND METHOD," with named inventors Steven B. Lindsay, Andrew SeungHo Hwang, Andrew M. Naylor, Scott Sterling McDonald and Habib Anthony Abouhossien filed on Apr. 24, 2002, the entire contents of which is incorporated herein by reference as though set forth in full. The present application also is related to co-pending United States patent application entitled "ASF MEMORY LOADING AND HANDLING SYSTEM," with named inventors Steven B. Lindsay, Andrew SeungHo Hwang and Andrew M. Naylor filed on Apr. 24, 2002, the entire contents of which is incorporated herein by reference as though set forth in full. The present application also is related to co-pending U.S. patent application entitled "INTEGRATED GIGABIT ETHERNET PCI-X CONTROLLER," with named inventors Steven B. Lindsay, Andrew SeungHo Hwang, Andrew M. Naylor, Michael Asker, Jennifer Chaio, Myles Wakayama and Gary Alvstad filed on Apr. 24, 2002, the entire contents of which is incorporated herein by reference as though set forth in full.

FIELD OF THE INVENTION

The present invention relates to networked computing systems, and more specifically, to networked computing systems that may function in an operating system absent environment.

BACKGROUND

To reduce the total cost of ownership of computing systems such as personal computers, a number of technologies have been developed to provide more cost effective system maintenance and to maximize system "up-time". For example, some of these technologies give IT administrators more visibility and control over remote systems. Traditionally, these technologies require that the "managed" system is an operational state with the Operating System (e.g., Microsoft Windows®) of the computing system loaded. Examples of technologies that require the operating system ("OS") to be loaded are DMI and CIM.

In general, however, technologies that require the OS to be loaded do not allow an administrator to have remote visibility or access to systems that have serious hardware or software problems that prevent the OS from loading or working correctly. In addition, these technologies do not allow for a system to be remotely managed while in a low power mode. For these scenarios, there is a need for a standardized low-level technology that gives administrators remote access to and control over the managed system.

Several vendors have developed proprietary technologies in this area. Intel and IBM created Alert on LAN (AoL) technology. AoL provided remote notification of local system states and various hardware or software failures in an OS absent environment. In addition, Intel and others developed the Platform Event Trap ("PET") format, to describe how alerts were formatted over the network.

As the number of these technologies increased, computing system vendors were faced with the possibility of having to support several different alerting standards. As a result, the Distributed Management Task Force developed an open remote control and alerting standard: the Alert Standard Format ("ASF").

ASF is a specification that defines methods for alerting and remote system control. ASF is specifically targeted at OS-absent environments. As used herein, the term "OS-absent" refers to a computer system that is in a state including, without limitation, a no active OS state, an inoperable OS state, a low-power state, and/or a system-sleep state.

The remote control and alerting system defined by ASF includes a management system that communicates with one or more clients. Here, the term "client" refers to a managed computing system. Typically, the management system is located remotely from the computing systems and communicates with the clients via a network. An alert sending device ("ASD"), which is a component in each client, interfaces with other components in the computing system to respond to remote control requests from the management system. Such requests include, for example, power-up, power-down and maintenance requests. The ASD also interfaces with sensors in the client computing system. When a sensor detects an "alert event," the ASD in the client sends a corresponding alerting message to the management system. To this end, the ASF specification defines interfaces for sensors, alert sending devices (which may include, for example, network interface cards or Modems), remote management console software, and system firmware in order to allow system vendors (and system component vendors) to develop ASF compliant products.

In summary, the above technologies, collectively referred to as "system manageability" technologies, enable remote system access and control in both OS-present and OS-absent environments. These technologies are primarily focused on minimizing on-site maintenance; maximizing system availability and performance to the local user; maximizing remote visibility of (and access to) local systems by network administrators; and minimizing the system power consumption required to keep this remote connection intact.

While the technologies discussed above address some of the problems associated with "system manageability," they fall short of addressing many issues involved in providing a robust remote control and alerting system for computing systems. In particular, in networked computing systems, there is a need for a cost effective, yet highly high functional system for managing a computing system using standard protocols when the OS is not present.

SUMMARY

In one aspect of the present invention a method for supporting ASF in an ASD using one or more embedded processors. The method includes accepting ASF related packets, examining the ASF related packets using a firmware routine running on the one or more embedded processors and generating a response.

In yet another aspect of the present invention, a method for processing communications packets is disclosed. The method includes accepting a sequence of packets, the sequence of packets including a plurality of types of packets, detecting ARP (Address Resolution Protocol) packets, removing the ARP packets from the sequence of a plurality of types of packets and processing a response to the ARP packets.

In another aspect of the present invention, a method of providing ASF timers is disclosed. The method includes, providing a plurality of hardware timers, loading the timers with a count, starting the timers counting, creating an indication of timer expiration on expiration of the count for each timer, and examining the indication of timer expiration of at least one of the timers.

It is understood that other aspects of the present invention will become readily apparent to those skilled in the art from the following detailed description, wherein is shown and described only exemplary embodiments of the invention, simply by way of illustration. As will be realized, the invention is capable of other and different embodiments, and its several details are capable of modifications in various respects, all without departing from the invention. Accordingly, the drawings and description are to be regarded as illustrative in nature, and not as restrictive.

BRIEF DESCRIPTION OF THE DRAWINGS

Aspects of the present invention are illustrated by way of example, and not by way of limitation, in the accompanying drawings in which like reference numerals refer to similar elements.

DETAILED DESCRIPTION OF EMBODIMENTS OF THE INVENTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well known structures and devices are shown in block diagram form in order to avoid obscuring the concepts of the present invention.

Various aspects of the herein described alerting system design will be described in the context of a network server and a computer coupled to that network, however, those skilled in the art will appreciate that the herein described alerting system design are likewise suitable for use in various other communications environments. Accordingly, any reference to a network implementation is intended only to illustrate the inventive aspects of the present invention, with the understanding that such inventive aspects have a wide range of applications.

Figure 1A:
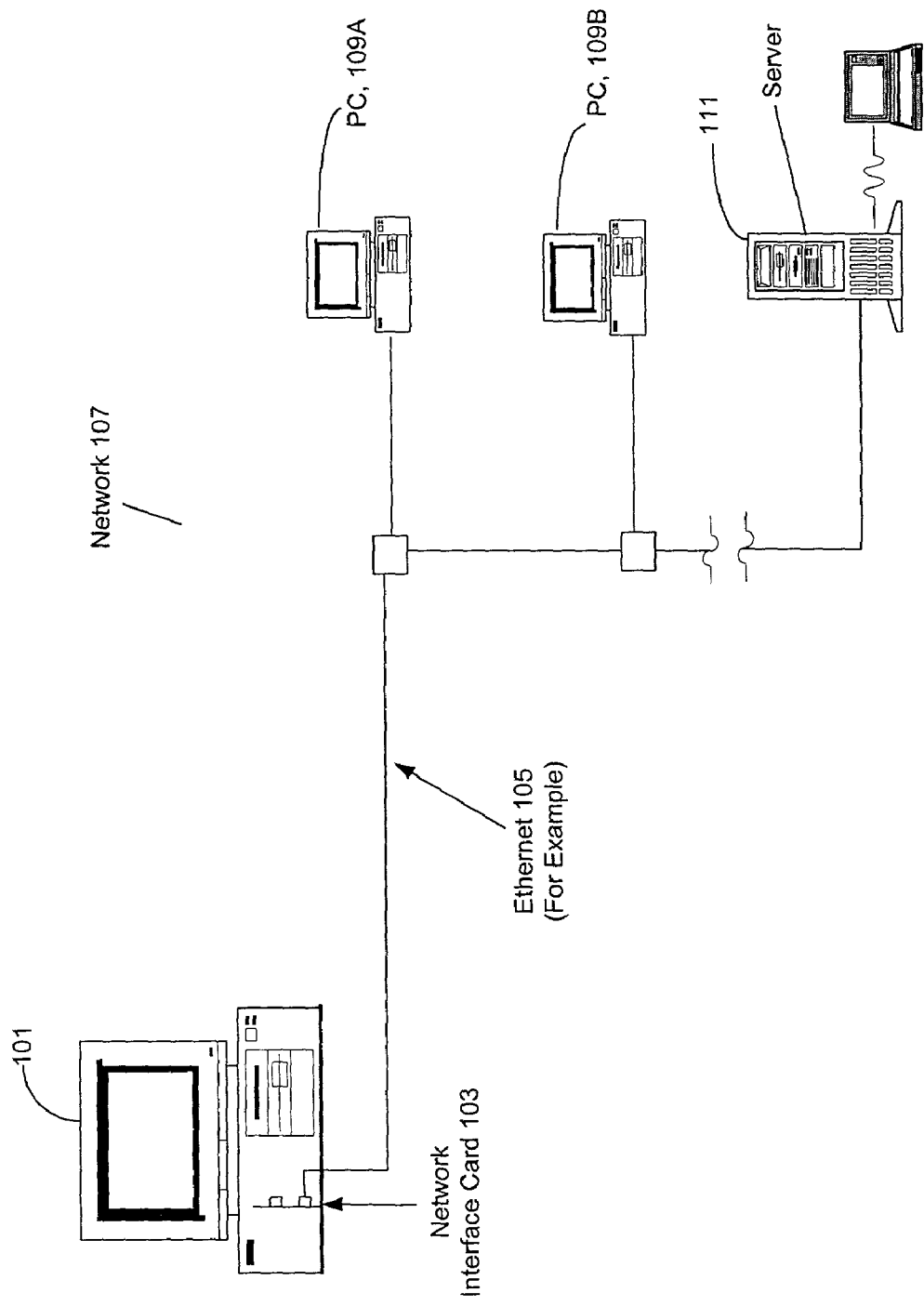
FIG. 1A is a graphical illustration of an exemplary environment which may contain several alerting embodiments.

Alerting is a term used to describe the notification of a network management function of the status of a remote unit. For example FIG. 1A illustrates an exemplary environment which may contain several alerting embodiments. In FIG. 1A a network 107 includes a remote computer 101. A network interface card 103 couples the exemplary computer to the network, for example using an Ethernet connection 105. If such a network interface card contained an ASD (Alert Sending Device) capability then computer 101 may be monitored and controlled, for example by a network administrator at a remote server 111. Such monitoring and control may be accomplished by an ASF enabled ASD even in the absence of a functioning OS being loaded in computer 101

An ASF enabled ASD sends an "alert" message over a network. This alert message may take the form, for example, of a Platform Event Trap (PET). A PET may be generated when a "sensor" indicates that is has detected an "alert event". An example sensor device would be an ASIC (Application Specific Integrated Circuit) that provides thermal sensors, voltage sensors, chassis intrusion detection, etc. These sensors may communicate event information to the ASD via an SMBus (System Management Bus). The ASD may then build a PET packet based upon the event information and transmit the PET packet to a management station on the network.

A PET may also be generated by the expiration of timers, such as for example, a watchdog or heartbeat timer. The ASD itself may be managing the heartbeat timer. If the timer expires the ASD may generate a PET.

An ASF enabled ASD needs to support the Remote Management and Control Protocol (RMCP). RMCP is a UDP (User Datagram based protocol), and is used for client control functions when a managed client is in an "OS absent" state. RMCP provides a way for a management console to remotely control and manage an ASF enabled client. Common control functions include operations such as system reset, system power-up, system power-down, etc.

The ASD commonly operates in a RMCP environment. Typically the ASD will parse incoming RMCP packets, and then take the appropriate action. For remote control commands (e.g. reset), the ASD parses the RMCP packet and then passes the resultant command, via the SMBus (System Management Bus), to the appropriate device in the system. For other RMCP management operations (e.g. a presence ping), the ASD will generate an RMCP response packet that contains the appropriate management information.

The ASF specification describes the ASD to have "OS absent" alerting and remote management capabilities necessary to comply with the specification. The ASF specification standardizes protocols and interfaces, but does not specify implementation details. Various ASF compliant ASD implementations are possible.

A designer may design dedicated hardware state machines that can do ASF protocol processing in an "OS absent" environment. Alternatively a designer may design an ASD with an embedded processing function (e.g. microprocessor) that allows firmware running on the ASD (hereinafter firmware) to handle ASF protocols and operations in conjunction with other hardware state machines.

The state machine approach incorporates the design in state machines and accordingly may lack flexibility. Significant bugs may have to be fixed in hardware rather than by changing firmware. This may be a problem if a bug is found while the product is already in the field and might require the feature to be disabled until new silicon was available that resolved the issue. ASF is still a relatively new technology that has not been deployed widely. The ASF standard (and ASF implementations) will likely evolve over time, and accordingly a more flexible approach may be desirable.

Figure 1B:
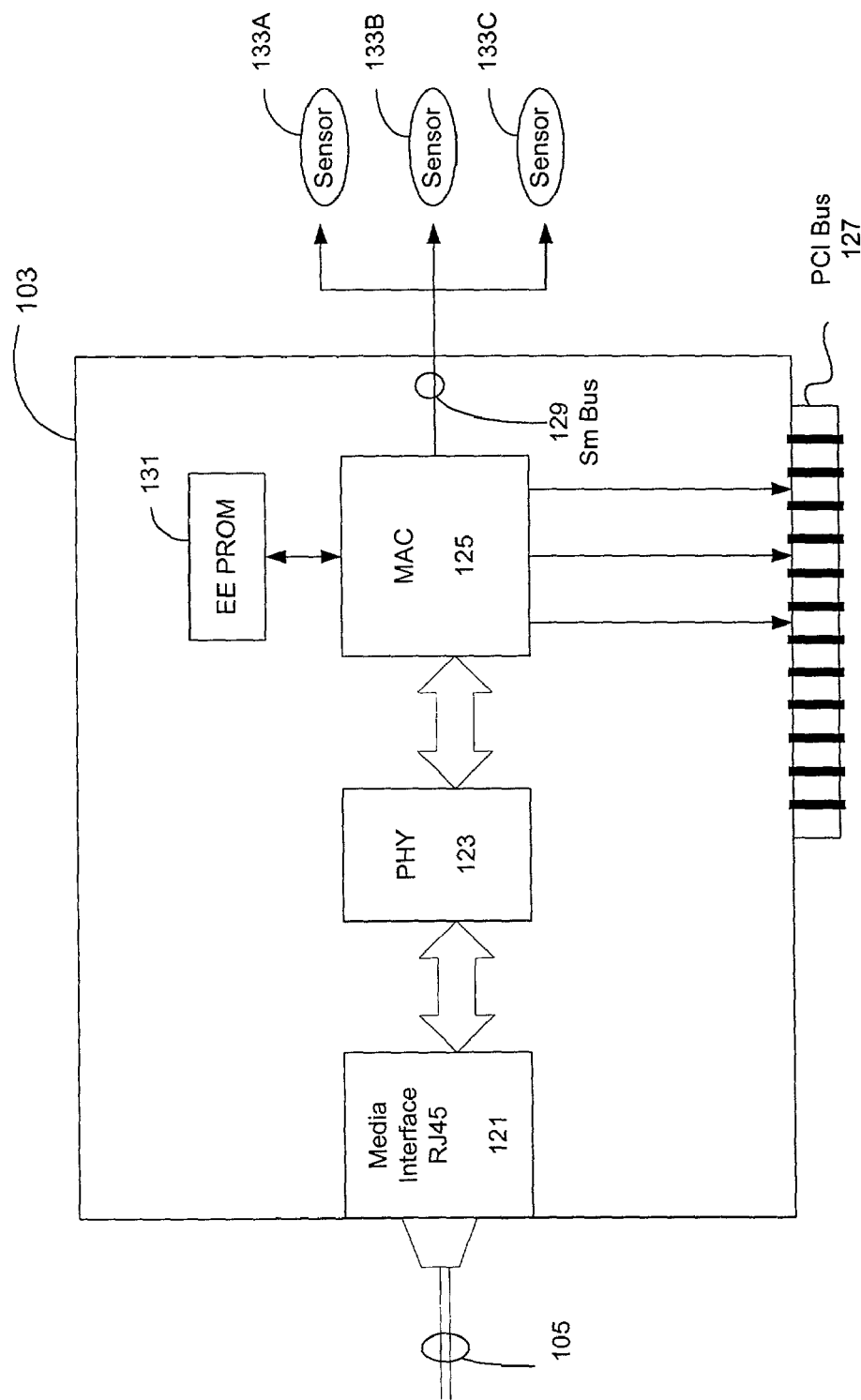
FIG. 1B is a block diagram of an alerting NIC as may be found on a network interface card.

FIG. 1B is a block diagram of an alerting MC as may be found on a network interface card. In FIG. 1B the network interface card 103 interfaces the PC 101 (not shown in FIG. 1B) using a PCI bus 127. The MAC (Media Access Controller) 125 interfaces with a PHY (Physical media interface), an EEPROM (Electrically Erasable Programmable Read Only Memory) 131, which may store the programs resident in the MAC 125 as well as parameter values. The MAC 125 also interfaces to a SMbus 129, which in turn in turn is coupled to exemplary sensors 133A, B, and C. The PHY 123 couples the MAC 125 to the media interface 121. In the exemplary embodiment illustrated in FIG. 1B the Media interface is a RJ 45 cable connector that interfaces to an Ethernet cable 105.

Figure 2:
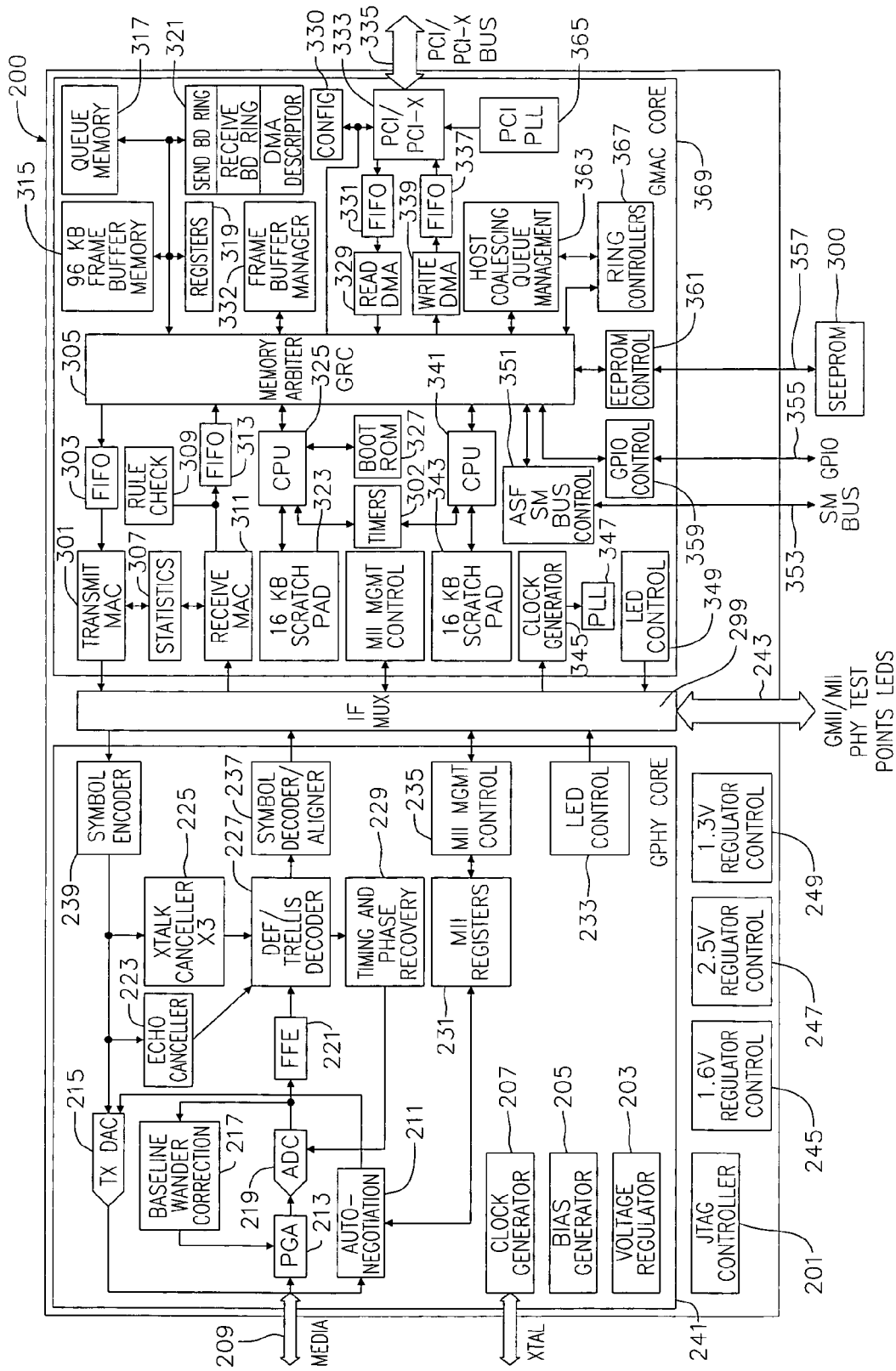
FIG. 2 is a block diagram of a VLSI integrated circuit that contains MAC, PHI, and ASD functions.

FIG. 2 is a block diagram of a VLSI integrated circuit that contains MAC, PHY, and ASD functions. In the circuit 200 of FIG. 2, dual on-board MIPs processors 325 and 341, which can be used to handle low-level ASF functions, are illustrated. Those skilled in the art will appreciate that a great number of equivalent processors can be substituted. Code running on processors 325 and 341 can intercept or inject data at various points with the device, and control all registers and functions in the device. The internal processors can interface with various functional blocks within the chip through the use of internal queue structures and these queue structures allow the processors to intercept or inject data into either the incoming or outgoing data stream. By using an on-board processor to run firmware that provides the "brains" behind the alerting and remote control functions, flexibility is achieved. Using an on-board processor to run firmware that provides the "brains" behind the alerting and remote control functions may provide the ability to add OEM specific extensions and solve problems via firmware changes. Because the firmware may be upgraded in the field, even errors found in the firmware may be fixed. The circuit 200 may be used in designs requiring an ASF enabled NIC/LOM (Lan On Motherboard) solution.

Data packets may enter the circuit 200 from the media 209, exemplarity an Internet connection. The packets then pass through the PHY (Physical Layer Interconnection) 241 and are accepted into the receive MAC (Media Access Controller) 311. The rules checker 309 then examines the packets. The rules checker is a pattern matching circuit, which compares the bytes of an incoming packet vs. the bytes of one or more filter patterns programmed by firmware or software. Furthermore the rules checker has a byte masking capability so that only specific bytes in the incoming packet are compared to the programmed patterns. Therefore the rules checker 309 can be used to identify packets belonging to certain protocols e.g. ARP or RMCP packets. The rules checker 309 places ASF packets in a memory FIFO 313 from where they are provided to ASF circuitry 351. By using the rules checker ARP or RMCP packets can be extracted from the packet stream without affecting or slowing down the non ARP or RMCP packets.

An ASF enabled NIC/LOM solution may include 4 components: ASD Hardware, ASD Firmware (assuming ASD HW contains an on-board processor), Software for ASF ASD setup/configuration (mainly a configuration utility) and development/debug tools.

The configuration utility retrieves alerting and RMCP information from system BIOS along with other configuration information from the end user, and stores this information in the ASD's EEPROM, e.g. serial EEPROM (SEEPROM) 300.

ASD firmware is loaded into the circuit 200 at power-up from the ASD's SEEPROM 300, and provides the intelligence to parse RMCP packets, generate Alerts, manage SMBus 353 interface, and control the hardware of the circuit 200.

Circuit 200 hardware provides the network interface 209, the raw SMBus interface 353, and SEEPROM interface 357 to various timers, memory, and registers that are used by the firmware.

Much of the intelligence in the illustrated ASF ASD solution resides in ASD firmware rather than in dedicated ASD hardware. This allows a degree of flexibility and freedom when changes need to be made to the ASD's ASF support. However, in order to assist ASD firmware in handling alerts and RMCP traffic, the underlying controller hardware has supplemental hooks and capabilities: i.e., 2 MIPs processors 325 and 341 with associated scratchpad memory 323 and 343; a rules-checker 309 for flexible ASF packet parsing; SMBus 2.0 Compliant interface 353; ASF related Timers 302; SEEPROM interface 361 for non-volatile storage of ASF related information; and Vaux (Auxiliary power) support.

Processor 325 has a dedicated 16 KB "scratchpad" memory 323 that can be used to store code and data that is used by the on-chip processor. Similarly Processor 341 has a dedicated 16 KB "scratchpad" memory 343 that can be used to store code and data that is used by the on-chip processor. Each processor can execute code out of its local scratchpad or out of the other processor's scratchpad, or out of frame buffer memory 315 (96 KB). However, faster code execution is achieved when firmware for a given processor is running out of that processor's scratchpad memory. The processors are capable of bootstrapping themselves via code stored in the attached SEEPROM 300 by utilizing the code stored in a boot ROM 327.

To allow firmware visibility and control of incoming packets the circuit 200 hardware allows the firmware running on the processors 325 and 341 to intercept, parse, and filter incoming packets. Packets enter the circuitry 200 via a connection to an external media, 209, such as an Ethernet cable. The circuit 200 hardware allows the firmware running on the processors 325 and 341 to inject transmit packets into an outgoing packet stream. Basically, the firmware has visibility and control over the data path, which helps the processors 325 and 341 to implement ASF protocol functions.

The circuitry 200 is equipped with a special state-machine called the "rules-checker" 309 that allows the application of a byte mask of up to 16 "rules" (I.e. patterns) against incoming packets. This pattern matching capability can be used by ASD firmware, which is run on processors 325 or 341 to parse incoming ASF packets (RMCP and ARP packets), and separate them from the rest of the packet data stream. This allows the processors 325 and 341 to be called on to service ASF related packets rather than having to inspect all received packets. This means that in an "OS present" environment, ASD ASF firmware may use the rules-checker to identify ASF related packets without interfering with, or slowing down, the non ASF packet steam. This is useful because if the internal processors had to inspect every single incoming packet, the internal processors would not be able to keep with full rate gigabit traffic.

An ASF ASD commonly supports a SMBus 2.0 compliant interface. The SMBus 353 is a two-wire interface that operates at relatively low speed (100 KHz max). An ASF ASD is capable of being both a SMBus master or a slave. SMBus 2.0 is an extension of SMBus 1.1, and devices that support SMBus 2.0 may also support SMBus 1.1.

In the present embodiment illustrated in FIG. 2 the firmware can control the SMBus interface through 2 mechanisms. The first mechanism allows firmware to directly control the SMBus pins. When using this mode, firmware incorporates a "SMBus driver" that can manually manipulate ("bit-bang") the SMBus signals. Since SMBus operates so much slower than the on-chip processors, this method may be sufficient although somewhat cumbersome. Another mechanism, however, may provide the firmware with a higher-level (lower overhead) SMBus logical interface. The hardware firmware interface includes a SMBus FIFO 303 and allows the hardware and firmware to pass bytes that traverse the SMBus. The hardware has the capability to generate and detect SMBus "start" and "stop" commands. SMBus PEC (Parity Check Code) is computed by hardware. The hardware supports the full range of allowed SMBus clock frequencies and clock stretching.

An ASF ASD must keep track of a number of timers. In the embodiment illustrated in FIG. 2, these timers are supported in hardware.

Figure 3:
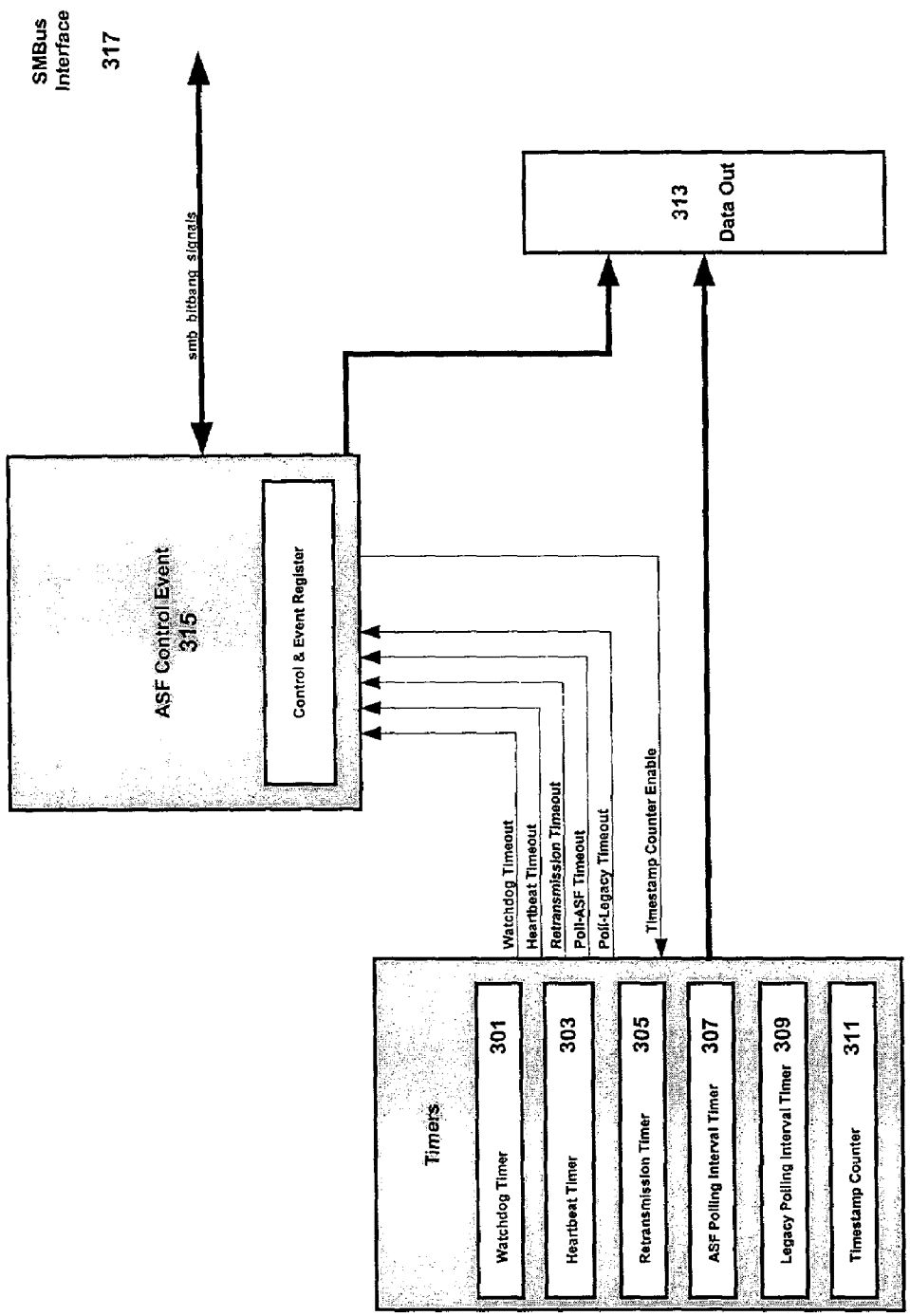
FIG. 3 is a block diagram of ASF timers according to an embodiment of the invention.

FIG. 3 is a block diagram of ASF timers according to an embodiment of the invention. In FIG. 3 the ASF timers are illustrated. The timers comprise a watchdog timer 301, a heartbeat timer 303, a retransmission timer 305; an ASF polling interval timer 309, and a timestamp counter 311. All of the timers count down (or up), and are implemented in hardware. These timers could be also be implemented in software, since a single software counting function can accommodate multiple timers. In the present embodiment however the timers are implemented in hardware. The timers may be loaded by processor 325 or 341. Once the timers count to a predetermined value, such as 0, they can generate an indication, such as a digital value, indicating that the count has expired. Such an indication can be provided to a register, such as 319, which can then be read by processor 325 or 341 at a convenient time, such as during an idle loop. By placing the timers in hardware the software is unburdened from the timing function and the reading of the timers to see if they have expired can be placed where they will not burden the processing, such as within a processor(s) idle loop.

Table 1 indicates the granularity of the timers and describes their function

TABLE 1

Timers needed in HW

| Timer Name | Granularity | Type | Description |
| --- | --- | --- | --- |
| Watchdog | 1 second | Count down | Watchdog expiration PET is sent whenever this timer expires |
| Heartbeat | 1 second | Count down | A desirable feature for an ASF ASD is the capability to send a periodic "heartbeat" message. This timer can be used to indicate to firmware when a heartbeat message should be sent. |
| ASF Sensor Poll Interval | 5 milliseconds | Count down | The minimum time that the ASD should wait between polling ASF sensors. |
| Legacy sensor Poll | 250 milliseconds | Count down | The minimum time an ASD should wait in between a series of legacy polls. The ASF spec indicates that a period of 4 seconds should be used for this value. |
| PET Retransmission | 1 second | Count down | If PET re-transmissions are desired, a timer would be helpful. If multiple PETs are generated within a short period, ASD firmware may keep track of relative delta between re-transmission events. |
| Timestamp | 1 Seconds | Count up | Counts how much time has passed since ASD power-up. |

To assist the firmware in supporting alerting and RMCP, the ASD hardware provides storage for a number of ASF related data structures. Both volatile and non-volatile storage may be utilized. Non-volatile storage may be used for configuration information that must be permanently saved by the ASD's SW configuration utility. This configuration utility runs during the "one good boot" that is specified by the ASF specification, and is used to configure the ASD's ASF capabilities. In the present embodiment, the SEEPROM 300 is able to store 32 KB of ASF related content, which comprises ASF firmware code and configuration information in a number of ASF related data structures.

The circuit 200 hardware allows the necessary internal functions that support RMCP and alerting to be powered while operating off of a sufficient Vaux power source. These hardware functions include; the physical layer 241; the SMBus 2.0 353 interface; the transmit and receive Ethernet MAC 311 and 343; processors 325 and 341 and any memory that those processors use (for example 323, 343, 317 and 315); interface to attached non-volatile memory 361; any state machines that are used to: parse incoming packets; transmit packets generated by the processors 325 and 341; connect the processors with the MAC; track or store ASF related state information; etc. The hardware functions that would be disabled in low power mode include:

The PCI interface includes Configuration module 330; FIFOs 331 and 337; PCI/PCIX interface 333; FIFO 337 and PCI (Peripheral Connect Interface) PLL (Phase Lock Loop) 365 and DMA (Direct Memory Access engines 329 and 339).

ASD Firmware provides the intelligence that controls both the alerting and RMCP operations. This includes driving, for example, an Ethernet interface 209, formatting alerts, parsing incoming RMCP packets, and taking the appropriate action based on the contents of the remote control message. ASD Firmware also contains a subset of code that acts as a SMBus driver that manipulates the SMBus interface. The SMBus interface is used by the ASF capable ASD to interface with other ASF system components such as sensors.

A benefit of supporting ASF primarily in firmware as opposed to hard-coded logic in silicon is that the firmware-based approach is extremely flexible. With a simple firmware update, the circuitry 200 can support additional OEM specific management capabilities.

The exemplary circuit 200 hardware provides a 2-pin SMBus (353) v2.0 compliant interface. Firmware run by one or both of processors 325 and 341 controls and drives the SMBus (353) interface. Firmware control over this interface allows extensibility and flexibility.

System firmware supports the ASF SMBus messages defined in section 5 of the ASF spec. Firmware may also be developed to support future ASF messages, or customer specific messages. For example, a customer could define a new ASF SMBus message that allows for a system micro-controller to command an ASF ASD to send a generic packet (as opposed to a PET packet) via the SMBus. The packet data for this generic packet could be encapsulated in an OEM specific SMBus message. To support this type of customer specific message, firmware may be developed to parse and handle these new types of SMBus messages.

One of the new features of the SMBus 2.0 protocol is the concept of a Unique Device Identifier (UDID). The UDID is used as part of SMBus Address Resolution Protocol (ARP). SMBus ARP should not be confused with Network ARP. Conceptually, both ARP protocols perform a similar function, but for entirely different media interfaces.

NIC firmware (i.e. firmware that runs on CPUs 325 and 341) allows the SMBus ARP protocol to assign the ASF ASD its SMBus address. This is a requirement for NIC add in cards. A dynamically assigned SMBus address will remain for the duration that power (including Vaux) is supplied to the ASD or until the ASD is reset. Alternatively, for LAN on motherboard (LOM) implementations, a fixed SMBus address could be used.

ASF ASD firmware may use the SMBus ARP protocol to get the SMBus address for ASF sensors that do not have a fixed address (ASD configuration software should have already retrieved and stored the SMBus address for fixed ASF sensors and legacy (non-ASF) sensors). ASF ASD firmware accomplishes this by polling the SMBus address space (using the Directed Get UDID command) looking for ASF sensors. The firmware then records the address of any ASF sensors. Later, the ASF firmware polls these sensors for alerts at a regular interval.

NIC firmware gathers alerting information via the SMBus. This information may be extracted via polling legacy sensors, or ASF sensors. Alternatively, ASF sensors can push alerts to the ASD. Once the ASD firmware detects that it needs to send an alert, it formats a Platform Event Trap (PET). Formatting the PET packet is not trivial. It requires the ASD to take the alert event information from the sensor, and then build an SNMP message, and then apply ASN.1 BER (bit encoding rules) to the SNMP message to construct an Ethernet packet. In this example, all of this is done by NIC firmware. After sending the PET, the firmware controls the retransmissions of the PET message.

The firmware periodically polls each legacy sensor that is listed in an ASF_ALRT data structure described in the ASF spec. This data structure will have been extracted from system firmware by ASD configuration software and stored in the ASD's SEEPROM 300. This structure contains information about each legacy sensor including its address on the SMBus, and information about the alert events that it could signal. The firmware polls these legacy sensors using a SMBus read byte protocol. The firmware records the current state of the sensor, compares against past results and a mask, and determines if a PET needs to be sent. This process is described in the ASF spec. The frequency that legacy sensors are polled is programmable.

The firmware also periodically polls ASF sensors. Before regularly polling ASF sensors, firmware attempts to discover ASF sensors by using the ARP (Address Resolution Protocol) to discover ASF sensors and then uses the SMBus Device Type Poll message to discover whether an ASF device is a sensor capable of handling poll alert messages. The firmware then stores the addresses of the sensors that it discovered. This discovery process needs to occur every time the system is powered-up. The firmware adds to the list of discovered sensors any fixed address undiscoverable sensors that configuration software would have found and listed in the SEEPROM 300.

Once ASD firmware has a complete list of ASF sensor address, the ASD firmware generates a SMBus Get Event Status message to each sensor to determine if a sensor has registered an alert event. If a sensor does have a new alert event, then ASD firmware uses the SMBus Get Event Data message to retrieve the specific data that pertains to the new event.

The frequency in which ASF sensors are polled is determined by the Minimum ASF Sensor Inter-Poll Wait Time value in the ASF_INFO structure.

It is also possible for ASF sensors, or system firmware, to detect an alert event and to push that alert event to the ASD (rather than having the ASD poll for the event). This can be accomplished via the SMBus General Push Alert message. These messages are variable in length and contain the event data that goes into the PET. The firmware properly responds to these "push alert" messages.

Push messages can direct the ASD to send a PET with or without retransmission.

System BIOS can command the ASD to start or stop a watchdog timer via the SMBus messages Start Watchdog Timer and Stop Watchdog Timer. If the NIC firmware receives a start watchdog message while it already has a watchdog timer running, it reinitializes the watchdog timer that is kept in hardware. If the hardware watchdog timer expires, an event is generated and ASD firmware is notified. The ASD firmware then generates a PET message.

ASD Firmware Generation and Formation of PET packets

In an ASF system, there may be multiple components that can detect various "Platform Events" and signal to the ASD to send an alert to a remote management console. A platform event is defined as an event that is originated directly from platform firmware (BIOS) or platform hardware (ASIC, chip set, or micro-controller) independently of the state of the operating system. Examples of components that could originate a "Platform Event" include (but are not limited to): the host system BIOS (for example the BIOS in the host PC 101); voltage, temperature, or chassis intrusion sensors; a system management micro-controller; OS Bootstrap loader or ASD watchdog timer (e.g. 301) expiration.

There are a number of different ways that the ASD can be notified that it needs to send an alert over the network. Commonly this notification may occur over the SMBus, for example, via the following mechanisms: from the ASD polling a legacy sensor; from the ASD polling an ASF sensor; from the ASD receiving a push alert from an SMBus device (e.g. sensor or BIOS). The alerting device may then extract the event data from the event source, and format a Platform Event Trap (PET) message that will be sent out over the network.

Once the firmware has determined that a PET needs to be sent, firmware may build and transmit the PET packet. In order to do this, the firmware will have to gather information that came from multiple sources (e.g. SEEPROM 300, SMBus messages, etc.).

PET messages are formatted as SNMP (Simple Network Management Protocol) trap frames. SNMP and PET are commonly considered to be media independent. Therefore, depending on the medium, the associated header fields will be different. However, SNMP is usually layered over UDP/IP.

When the firmware formats a PET, it will construct a packet that has an Ethernet header, IPv4 header, and UDP header in front of the SNMP PET data.

If alerting is supported, the configuration application will for example store the necessary information in the SEEPROM 300 so that the firmware can generate a PET with the correct Ethernet header, IP header, and UDP header. Many of the fields in these headers will be fixed (e.g. IP protocol=UDP), but some fields are computed on a per PET packet basis. For instance, the UDP checksum is computed on a per PET packet basis, because the UDP data will change from packet to packet.

In the exemplary ASF environment illustrated in FIG. 2, an ASF enabled managed client, for example the PC 101, might receive RMCP packets when the client is in an "OS absent" or "pre-boot state". The ASF-client's ASD will have to parse these incoming packets and take the appropriate action.

When a station receives an RMCP packet, it may generate an acknowledgement. The firmware generates acknowledgements when appropriate. The acknowledgement indicates that the RMCP packet was received.

The management server, for example 111, may send messages to cause an ASF enabled managed client to perform a hard-reset, power up, power-down, or power cycle reset. The reset, power up, and power cycle message types can optionally include Boot Options in its variable data.

After receiving and parsing a RMCP remote control packet, the firmware directs the control message to the corresponding control device on the SMBus. Several types of control messages and responses may occur, for example RMCP Request Response packets. An RMCP control message may allow for 3 different request-response pairs: presence ping—presence pong; system state request—system state response, RMCP capabilities request—RMCP capabilities response.

With each of these request-response pairs, the ASF remote console will request information from the ASF managed client, for example Personal Computer 101 in FIG. 1, and the ASD (for example circuit 200) in the ASF managed client will generate the appropriate response.

An ASF-aware remote console may send a presence ping RMCP message to the managed client to request a client to respond with a presence pong message. Presence pong packets respond with data defined in the ASF spec. The firmware constructs this response data based on capability information that was stored in the ASD EEPROM by ASD configuration software.

An ASF-aware remote console may send a system state request RMCP message to the managed client 100 to request a system state response message. The firmware constructs a response based on the system state information that it last received from the SMBus message Set System State. It is the responsibility of system BIOS to pass this SMBus message to the ASD immediately after each system reset. The ASD then stores this information in its internal memory. If the ASD has not received a Set System State since the last system reset, then it responds to this RMCP message with an "unknown" state.

An ASF-aware remote console, for example the server 111 of FIG. 1A may send a capability request RMCP message to the managed client, for example the computer 101 of FIG. 1A, to request a client to respond with a capability response message. The firmware constructs a response based on capabilities information that is stored in the ASD's SEEPROM 300.

Address Resolution Protocol (ARP) is commonly used by end stations and routers to associate an Ethernet MAC (Media Access Controller) address with an IP address. Systems and routers will normally have an ARP cache that will expire after a period of time. If a router is supposed to forward a packet to a specific IP address, but it doesn't have an entry for that IP address in its ARP cache, then it will generate an ARP request to get the Ethernet MAC address that is associated with the IP address in question.

In order for the RMCP protocol to function in an OS-absent state, the alert-sending device must be capable of responding to network Address Resolution Protocol (ARP) requests from the local router. If the alert sending device was not capable of responding to ARPs on its own, then a router may not be able to forward an RMCP packet to the ASF enabled station because the router would not know the end station's Ethernet MAC address. Accordingly the firmware has the intelligence to detect network ARP requests and automatically generate an ARP response without any intervention from host based system software. In such a case the firmware is aware of what the IP address and the MAC address are for the ASD (firmware will have access to this information because it is stored in in the ASD's SEEPROM 300).

In "OS present" situations, the NIC firmware does not automatically respond to ARP requests, rather the ARP request is handled by a standard network stack that is part of the network operating system. This allows the OS network stack to update its own ARP cache entries. The NIC firmware and the NIC device driver which functions only when the OS is present have a simple handshake mechanism that allows the NIC firmware to know when the OS is "present".

Operating Systems (e.g. Windows) may require that a ASD wake-up the system upon receiving a packet that matches a prescribed packet filter. One of the commonly used wake-up packet filters is for ARPs. Another is for directed IP packets (which includes RMCP packets). The NIC firmware has an optional capability that allows users to disable wake-up on ARP and wake-up on RMCP reception.

Those skilled in the art will appreciate that the various illustrative logic blocks, components, modules, circuits, and algorithms described in connection with the embodiments disclosed herein may be implemented as electronic hardware, computer software, or combinations of both. The various illustrative logic blocks, components, modules, circuits, and algorithms have been described above generally in terms of their functionality.

The various illustrative logical blocks, components, modules, and circuits described in connection with the exemplary embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the exemplary embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for supporting ASF (Alert Standard Format) in an ASD (Alert Sending Device) using one or more embedded processors, the method comprising:
   receiving a packet stream comprising both ASF and non-ASF packets;
   separating the ASF packets from the non-ASF packets;
   accepting the ASF related packets to be processed;
   examining the accepted ASF related packets using at least one firmware routine running on the one or more embedded processors; and
   generating an appropriate response, based on the examination of the accepted ASF related packets.

2. The method of claim 1, comprising filtering of ASF (Alert Standard Format) packets by comparing packets in the packet stream in a programmable pattern detector.

3. The method of claim 2, wherein the filtering comprises performing pattern matching using non-processor-based hardware.

4. The method of claim 2, wherein the filtering comprises performing pattern matching using a state machine.

5. The method of claim 1, wherein the one or more embedded processors comprise two embedded processors operating in parallel.

6. A method for supporting ASF (Alert Standard Format) in an ASD (Alert Sending Device) using one or more embedded processors, the method comprising:
- receiving a packet stream comprising both ASF and non-ASF packets;
- separating the ASF packets from the non-ASF packets;
- accepting the ASF related packets to be processed;
- examining the accepted ASF related packets using a firmware routine running on the one or more embedded processors; and
- generating an appropriate response, based on the examination of the accepted ASF related packets,
- wherein the one or more embedded processors are running different aspects of the ASF protocol.

7. The method of claim 6, wherein the examining of the accepted ASF (Alert Standard Format) related packets comprises interpreting a RMCP (Remote Management Control Protocol) packet.

8. The method of claim 7, wherein the examining of the accepted ASF (Alert Standard Format) related packets comprises interpreting a SMBus message.

9. The method of claim 7, wherein the examining the accepted ASF (Alert Standard Format) related packets comprises interpreting a ASF packet.

10. The method of claim 7, wherein the generating of the appropriate response comprises executing a firmware routine that generates a PET (Platform Event Trap) packet.

11. The method of claim 7, wherein the generating of the appropriate response further comprises executing a firmware routine that generates a RMCP response packet.

12. The method of claim 7, wherein the generating of the appropriate response comprises executing a firmware routine that generates a SMbus response.

13. A method for processing communications packets in an ASD, the method comprising:
- accepting a sequence of packets in an ASD (Alert Sending Device), the sequence of packets comprising a plurality of types of packets;
- detecting Remote Management and Control Protocol (RMCP) packets in the accepted sequence of packets, wherein the detecting of the RMCP packets comprises:
  - accepting the packets in a rules checker; and
  - comparing the packets to the rules, defining RMCP packets, in the rules checker,
- wherein the rules checker is non-processor-based hardware that performs pattern matching;
- removing the detected RMCP packets from the sequence of the plurality of types of packets, without affecting or slowing down non RMCP packets within the sequence of packets; and
- notifying at least one processor to process the removed RMCP packets.

14. An apparatus for processing communications packets in an ASD (Alert Sending Device), the apparatus comprising:
- an input for accepting a sequence of packets in an ASD, the sequence of packets comprising a plurality of types of packets;
- a pattern matching circuit for detecting RMCP (Remote Management and Control Protocol) packets within the sequence of packets, wherein the pattern matching circuit is non-processor-based hardware that performs pattern matching; a queue for placing the detected RMCP packets in; and
- at least one processor that enables removal of the RMCP packets from the queue and processing the removed RMCP packets.

15. An apparatus for supporting ASF (Alert Standard Format) in an ASD (Alert Sending Device) using one or more embedded processors, the apparatus comprising:
- one or more circuits that are operable to:
  - receive a packet stream comprising both ASF and non-ASF packets;
  - separate the ASF packets from the non-ASF packets;
  - accept the ASF related packets to be processed;
  - examine the accepted ASF related packets using at least one firmware routine running on the one or more embedded processors; and
  - generate an appropriate response, based on the examination of the accepted ASF related packets.

16. The apparatus of claim 15, wherein the one or more circuits are operable to filter ASF (Alert Standard Format) packets by comparing packets in the packet stream in a programmable pattern detector.

17. The apparatus of claim 15, wherein the one or more embedded processors comprise two embedded processors operating in parallel.

18. An apparatus for supporting ASF (Alert Standard Format) in an ASD (Alert Sending Device) using one or more embedded processors, the apparatus comprising:
- one or more circuits that are operable to:
  - receive a packet stream comprising both ASF and non-ASF packets;
  - separate the ASF packets from the non-ASF packets;
  - accept the ASF related packets to be processed;
  - examine the accepted ASF related packets using a firmware routine running on the one or more embedded processors; and
  - generate an appropriate response, based on the examination of the accepted ASF related packets,
- wherein the one or more embedded processors are running different aspects of the ASF protocol.

19. The apparatus of claim 18, wherein the examining of the accepted ASF (Alert Standard Format) related packets comprises interpreting a RMCP (Remote Management Control Protocol) packet.

20. The apparatus of claim 18, wherein the examining of the accepted ASF (Alert Standard Format) related packets comprises interpreting a SMBus message.

21. The apparatus of claim 18, wherein the examining of the accepted ASF (Alert Standard Format) related packets comprises interpreting a ASF packet.

22. The apparatus of claim 18, wherein the generating of the appropriate response comprises executing a firmware routine that generates a PET (Platform Event Trap) packet.

23. The apparatus of claim 18, wherein the generating of the appropriate response comprises executing a firmware routine that generates a RMCP response packet.

24. The apparatus of claim 18, wherein the generating of the appropriate response comprises executing a firmware routine that generates a SMbus response.

* * * * *